United States Patent Office 3,352,818
Patented Nov. 14, 1967

3,352,818
STABILITY OF POLYOLEFINES
Gerhard Meyer, Obernburg, Erhard Siggel, Seckmauern uber Hochst, Odenwald, Albert Schöpf, Hering uber Hochst, Odenwald, and Helmut Mägerlein, Erlenbach, Germany, assignors to Vereinigte Glanzstoff-Fabriken AG, Wuppertal-Elberfeld, Germany
No Drawing. Filed Jan. 26, 1965, Ser. No. 428,238
Claims priority, application Germany, Jan. 31, 1964,
V 25,294
14 Claims. (Cl. 260—45.7)

ABSTRACT OF THE DISCLOSURE

Stabilizing a high molecular weight poly-α-monoolefine such as propylene against oxidation by heating it in finely divided form dispersed in an inert hydrocarbon or a lower alkanol containing a small amount of an organic hypochlorite, e.g. 0.01 to 1% by weight with reference to the poly-α-monoolefine, under agitation and in the presence of UV-rays, for example at temperatures of 40–170° C. for a period of one-half to one hour, and then separating the poly-α-monoolefine from the liquid medium. An example of the organic hypochlorite is tert.-butyl-hypochlorite. The resulting stabilized poly-α-monoolefine is useful in producing filaments, films and molded articles resistant to oxidation.

---

This invention is concerned with a process for treatment of high molecular weight polyolefines so as to improve their stability against oxidation. More particularly, the invention relates to a method of contacting a polyolefine with a specific treating agent under conditions which are sufficient to enhance the oxidation-resistance of the resulting polyolefine product.

It is known that valuable products in the form of filaments, films, foils or other extruded or molded articles can be produced from polyolefines obtained by the addition polymerization of monomeric olefines, such as the alpha-monoolefines of from 2 up to about 10 carbon atoms. Especially favorable properties are exhibited by solid high molecular weight polyolefines which have been obtained by the so-called low pressure polymerization process requiring the use of a stereospecific catalyst or the so-called Ziegler catalysts. Although such polyolefines have advantageous properties such as high strength, high density, relatively higher melting points and general resistance to chemical attack, they exhibit a somewhat limited stability against attack by oxygen, especially where there is simultaneous application of heat and/or exposure to ultraviolet rays. The damage shown by polyolefines under such oxidation conditions has been attributed to the presence of double bonds in or on the molecular chain of the polymer, these double bonds or olefinically unsaturated portions of the molecule being particularly susceptible to attack by oxygen. It does not appear to be possible to prevent or avoid the occurrence of these double bonds by any special precautions during polymerization. Therefore, in order to improve the stability of the polyolefine, it is apparently necessary to subject the polymer to an after-treatment which will tend to saturate the double bonds.

For example, it has been suggested that the polymer be subjected to a treatment with certain silicon compounds in which at least one hydrogen atom is attached directly to the silicon atom. In this known process, the polyolefine must be dissolved in a solvent and stirred for a relatively long period of time together with the silicon compound and a suitable catalyst. Aside from the fact that this process requires the use of considerable amounts of solvents and precipitation agents, it is unusually expensive because a thorough purification must be carried out after the treatment with the silicon compound and precipitation of the treated polymer from its solution.

According to an alternative of this known process, the stabilizing treatment can also be carried out by mixing the polyolefine with the silicon compound in an extruder at elevated temperatures, e.g. 250–300° C. However, a uniform stabilization is not obtained in this manner. Furthermore, this process suffers from the disadvantage that the silicon compound remains in the polymer.

In another known process, hydrogenation of the double bonds has been attempted in order to solve the problem of stabilization. The polyolefine in the form of a solution, emulsion or suspension is conducted through a suitable hydrogenation reaction vessel where it is brought into contact with a specific hydrogenation catalyst. This process requires a considerable expenditure in apparatus and time and is not suitable for treating large amounts of polyolefines. Finally, this method is disadvantageous in that the treated polyolefine must be subjected to additional steps for removal of the heterogeneous hydrogenation catalyst which would otherwise cause trouble in the normal processing of the polyolefine into finished articles.

The primary object of the present invention is to provide a process of treating a polyolefine which will lead to an improved product exhibiting better resistance to oxidation and aging, especially such oxidation as may occur in normal use of the polymer where it is exposed to heat and light.

Another object of the invention is to improve the stability of polyolefines against oxidation by a process or method which can be carried out in an economical manner and under easily controlled conditions.

Yet another object of the invention is to provide a process for improving the stability of polyolefines whereby conventional apparatus can be employed and the necessary steps can be readily combined with conventional polymerization processes for the production and separation of a substantially pure polyolefine.

Still another object is to improve the polyolefine stability by a process which permits the treatment of large quantities of the polymer on a commercial scale.

These and other objects and advantages of the invention will become more apparent after considering the following detailed specification.

It has now been found, in accordance with the present invention, than an improved polyolefine product can be obtained by dispersing the polyolefine as a finely divided powder in an inert organic liquid consisting of a hydrocarbon or a lower alkanol containing a small amount of an organic hypochlorite, and heating this dispersion with mixing or agitation in the presence of UV-rays and at a temperature from about room temperature up to the boiling point of the inert organic dispersing liquid, e.g. from about 40° C. to 170° C. and preferably about 50°–120° C., for a period of time sufficient to enhance the oxidation-resistance of the polyolefine. The polyolefine is then separated from the dispersion, for example by filtration, and is then preferably washed two or more times with the inert organic liquid and finally dried by evaporation or distilling off any adherent organic liquid.

The process of the present invention is particularly advantageous for the treatment of poly-alpha-monoolefines of from 2 up to about 8 carbon atoms in the monomeric alpha-monoolefine, and especially good results have been achieved with the treatment of the polyolefines of the 3 to 6 carbon atom monomers, e.g. polypropylene, polybutylene or poly-4-methylpentene-1. The results are also quite significant where the treatment is applied to stereo-regulated or isotactic polyolefines as obtained by polymerization of the olefine under low pressure conditions in the presence of particular catalyst systems commonly referred to as stereospecific catalysts. These catalyst systems are well known in this art as well as the polymerization conditions and methods of recovering the isotactic polymer product. The preferred Ziegler catalyst contains $TiCl_3$ in combination with a trialkyl aluminum, e.g. triethyl aluminum.

The process of the invention is most conveniently carried out after the polyolefine has been purified, i.e. after polymerization has taken place and the polymer has been purified by removing and recovering the catalyst components therefrom. In the case of Ziegler type catalysts which are acid-soluble, the polymerization product is extracted with alcoholic-HCl, e.g. weak HCl in methanol, and the polymer is then washed and/or neutralized for substantially complete removal of the extractant and catalyst components. At this point, the purified polyolefine is in the form of a finely divided powder which can be readily subjected to the stabilizing treatment of the invention. Furthermore, the preceding steps are carried out in conventional apparatus with the substantial exclusion of oxygen and water, and the purified polyolefine can then be treated in the same apparatus under the same conditions of an oxygen-free and moisture-freee environment, thereby avoiding any procedural complications in the overall process.

The purified polyolefine powder is normally obtained in conventional polymerization processes in a particle size which is quite suitable for the stabilizing treatment of the invention within a reasonable period of time. Smaller particles can usually be treated at lower temperatures and/or shorter periods of time. In general, it is desirable to use particle sizes of about 0.1 mu to 500 mu.

The organic hypochlorite employed as the treating agent can be added to the inert organic dispersing liquid in quite small amounts of at least 0.001% and preferably about 0.01 to 1% by weight, with reference to the total amount of the polyolefine. Somewhat higher amounts of the organic hypochlorite, e.g. up to 2% or even 5% by weight (with reference to the polyolefine), can also be employed but without any special advantage. In general, large amounts of the hypochlorite should be avoided.

Suitable organic hypochlorites include all of the known tertiary-alkylhypochlorites such as t-butylhypochlorite or t-heptylhypocholorite and also secondary hypochlorites with an aromatic substituent such as phenylethylhypochlorite.

Other suitable tertiary alkyl hypochlorites are those of 2-methylbutanol-2, 2-cyclohexylbutanol-2, 2-methylpentanol-2, 2-cyclohexylpentanol-2, 3-methylpentanol-3, 3-cyclohexylpentanol-3, 2-methylhexanol-2, 2-cyclohexanhexanol-2, 3-ethylhexanol-3, 3-cyclohexanhexanol-3, 2-phenylpentanol-2, 2-tolylpentanol-2 and secondary hypochlorites are those of α-tolylethanol, α-phenylpropanol, α-tolylpropanol, α-naphthylpropanol, α-phenyl-n-butanol, α-tolyl-n-butanol, α-naphthyl-n-butanol, α-phenyl-i-butanol, which can be produced according to the generally known procedures e.g. by chlorination of alcohols (Sandmeyer, Ber. 19, 857 (1886)), or by reaction of hypochlorous acid with alcohols (Taylor et al., Am. Soc. 47, 395 (1925)).

Dispersing agents which can be used as an inert liquid medium for the stabilizing treatment include the inert hydrocarbons such as pentane, hexane, heptane, benzine, benzene, toluene, xylene, decalin, tetralin and diesel oil, or the inert liquid medium may also be a lower alkanol of up to about 7 carbon atoms, preferably 1 to 4 carbon atoms, such as methanol, ethanol, n-propanol, isopropanol and butanol. Of course, mixtures of the hydrocarbons or mixtures of the lower alkanols may also be employed, and one liquid can be used during the treatment itself while employing a different liquid for washing, but it is generally more convenient to use the same liquid for all of the process steps.

It is particularly desirable to employ a hydrocarbon or an alcohol as the dispersing agent which is easily volatilized because it is then much easier to separate and recover the inert liquid after the stabilization treatment is completed. For example, those hydrocarbons and alcohols with boiling points below about 100° C. are especially useful.

The temperatures and periods of time for any specific treatment obviously depend on the number of different factors. In general, the treatment can be completed more quickly at higher temperatures. In order to shorten the treatment period, it is also possible to work under elevated pressure in a closed vessel at temperatures which extend up to the boiling point of the dispersing agent at the pressure being considered. Thus, by working under pressure, low-boiling hydrocarbons or alcohols can be used at much higher temperatures to obtain correspondingly shorter periods of treatment. In general, the process of the invention can be accomplished with treatment periods of only about 20 minutes up to about 2 hours, preferably about 30 minutes to 1 hour.

By comparison with known stabilizing methods, the process of the present invention offers the advantage that it can be carried out directly in conjunction with the purification of the polymer without interfering with the normal polymerization or the separation and recovery of the polymerization catalyst and purified polymer. All of the dispersing agents suitable for the stabilizing process of the invention are also solvents which have been found to be useful in the preceding purification process. The excess dispersing liquid can be separated by filtration or centrifuging, and the polymer is easily purified to remove substantially all of the treating agent by a simple washing with the inert organic liquid. Thus, it is possible to avoid a special purification as is required in known methods which use a heterogeneous catalyst for the stabilizing treatment. A much more uniform and extensive stabilization is obtained by contacting the polyolefine powder with the organic hypochlorite contained in the dispersing agent according to the invention than is possible by incorporating or engraining a stabilizing agent into the polymer.

The process of the invention is further illustrated but not limited by the following examples.

EXAMPLES 1–6

In a 1-liter two-necked flask equipped with a mixer and a mercury immersion lamp (70 watt), 100 grams of polypropylene or poly-4-methylpentene-1 were dispersed in 600 ml. of the dispersing agent under a nitrogen atmosphere. The polyolefine was that produced by polymerization of propylene or 4-methylpentene-1 in the presence of triethyl aluminum and $TiCl_3$ as a stereospecific catalyst. After completion of the polymerization, the resulting polymer powder was purified with hexane and with methanol in admixture with hydrochloric acid, washed neutral and then dried. The hypochlorite treating agent was then added to the dispersion, and the mixing device and the UV-lamp were turned on. The dispersion was then maintained at a substantially constant temperature for several hours, the details of each experiment being shown in the table below. Because of the heat developed by the lamp, it was necessary to externally cool the flask with water. Also, in order to avoid an undesirable decomposition of the polymer, the lamp was turned off after the first two minutes in each five-minute period throughout the entire treatment. After completing this treatment, the polymer was filtered off, washed twice with 100 ml. of the dispersing agent and then dried. The treated polymer was then measured for its oxidation stability.

TABLE

| Example No. | Percent by weight of t-butyl-hypochlorite* | Dispersing agent | Treatment time, min. | Temp., °C. | Stability, min. |
|---|---|---|---|---|---|
| 1 | 1 | Heptane | 45 | 98 | 94 |
| 2 | 0.8 | Methanol | 30 | 65 | 81 |
| 3 | | Heptane | 45 | 98 | 59 |
| 4 | | Methanol | 30 | 65 | 51 |
| 5 | 0.5 | Isooctane | 60 | 50 | 11 |
| 6 | | do | 60 | 50 | 7 |

*Percent by weight taken with reference to the amount of the polyolefine.

Examples 1–4 of the table relate to the treatment of polypropylene, whereas Examples 5 and 6 are concerned with the treatment of poly-4-methylpentene-1 which was otherwise obtained and treated in the same manner as polypropylene. Examples 3, 4 and 6 of the table were control experiments in which the hypochlorite treating agent was omitted.

For determination of the stability of the treated polyolefine in the foregoing examples, 30 grams of the polymer powder were ground in a ball mill for a period of 30 minutes with a stabilizing mixture of 0.03 gram dilauryl-thiodipropionate and 0.03 gram of 4,4'-thio-bis-(3-methyl-6-t-butyl-phenol), i.e. 0.1% by weight in each case. 12 grams of this mixture were pressed in a plate press at 170° C. and under a pressure of 350 atm. into a 1 mm. thick plate. The plate was cut into strips 3–4 mm. wide and 30–40 mm. long from which 3 grams were introduced into a test tube standing in an aluminum block maintained at 200±1.5° C. and connected to an oxygen burette. By controlling the volume of oxygen, the time in minutes was determined for the spontaneous absorption of oxygen to begin. This induction period for the oxidation of the polymer at 200° C. in pure oxygen serves as a measure of the stability at room temperature. In the case of poly-4-methylpentene-(1), the measurement was carried out at 230° C. and the oxygen was introduced into the stabilized, unpressed powder contained in the test tube.

Similar results can be achieved under conditions corresponding to the preceding examples by treating the polyolefine with organic hypochlorites such as 2-methylbutyl-hypochlorite-2, 2-cyclohexylbutyl - hypochlorite-2, 2-methylpentyl - hypochlorite-2, 2-cyclohexylpentyl-hypochlorite-2, 3-methylpentyl - hypochlorite-3, 3-ethylpentyl-hypochlorite-3, 3-cyclohexylpentyl - hypochlorite - 3, 2-methylhexyl - hypochlorite-2, 2-cyclohexylhexyl-hypochlorite-2, 3-ethylhexyl hypochlorite-3, 3-cyclohexylhexyl hypochlorite-3, 2-phenylpentyl hypochlorite-2, 2-tolylpentyl hypochlorite-2, and secondary hypochlorites are α-tolylethyl hypochlorite-1, α-phenylethyl hypochlorite-1, α-phenylpropyl hypochlorite-1, α-tolylpropyl hypochlorite-1, α-naphthylpropyl hypochlorite-1, α-phenyl-n-butyl hypochlorite-1 α-tolyl-n-butyl hypochlorite 1, α-naphthyl-n-butyl hypochlorite-1, α-phenyl-i-butyl hypochlorite-1 and or dispersing agents such as pentane, hexane, octane, cyclohexane, benzine, benzene, toluene, xylene, tetralin, dekalin, diesel oil, and also ethanol, propanol, i-propanol, n-butanol, n-pentanol, i-pentanol, cyclohexanol, benzylalcohol and other aliphatic or arylaliphatic alcohols which are liquid at the working temperatures.

The invention is hereby claimed as follows:

1. A process for improving the stability of a high molecular weight poly-α-monoolefine which comprises: dispersing said polyolefine as a finely divided powder in an inert organic liquid selected from the group consisting of hydrocarbons and lower alkanols containing a small amount of an organic hypochlorite selected from the group consisting of t-alkylhypochlorites and secondary hypochlorites with an aromatic substituent; heating said dispersion with agitation in the preesnce of UV-rays and at a temperature of about 20° C. up to the boiling point of said inert organic liquid for a period of time sufficient to enhance the oxidation-resistance of said poly-α-monoolefine; and separating the poly-α-monoolefine from said dispersion.

2. A process as claimed in claim 1 wherein said organic hypochlorite is present in an amount of at least 0.01% by weight, with reference to the poly-α-monoolefine.

3. A process as claimed in claim 1 wherein said organic hypochlorite is present in an amount of about 0.1 to 1% by weight, with reference to the poly-α-monoolefine.

4. A process as claimed in claim 1 wherein said dispersion is heated for a period of about 30 minutes to one hour.

5. A process as claimed in claim 1 wherein said dispersion is heated at a temperature of about 50° C. to 170° C.

6. A process as claimed in claim 1 wherein said dispersion is heated at a temperature of about 50° C. to 120° C.

7. A process as claimed in claim 1 wherein said organic hypochlorite is tert.-butyl-hypochlorite.

8. A process as claimed in claim 1 wherein said inert organic liquid is a hydrocarbon having a boiling point below about 100° C.

9. A process as claimed in claim 1 wherein said inert organic liquid is a lower alkanol of 1 to 4 carbon atoms.

10. A process as claimed in claim 1 wherein said dispersion is heated for about 30 minutes to one hour in the presence of about 0.1 to 1% by weight of said organic hypochlorite, with reference to the poly-α-monoolefine, at a temperature of about 50° C. to 120° C., and the poly-α-monoolefine is separated from the dispersion and washed with said inert organic liquid.

11. A process as claimed in claim 10 wherein said poly-α-monoolefine is polypropylene.

12. A process as claimed in claim 10 wherein said poly-α-monoolefine is poly-4-methylpentene-1.

13. The stabilized poly-α-monoolefine product obtained by the process of claim 1.

14. The stabilized poly-α-monoolefine products obtained by the process of claim 10.

References Cited

UNITED STATES PATENTS 3,014,799  12/1961  Oster _____ 260—94.9 X

DONALD E. CZAJA, Primary Examiner.

M. J. WELSH, Assistant Examiner.

UNITED STATES PATENT OFFICE
CERTIFICATE OF CORRECTION

Patent No. 3,352,818

November 14, 1967

Gerhard Meyer et al.

It is certified that error appears in the above identified patent and that said Letters Patent are hereby corrected as shown below:

Column 6, line 31, "50° C." should read -- 40° C. --.

Signed and sealed this 9th day of September 1969.

(SEAL)
Attest:

Edward M. Fletcher, Jr.
Attesting Officer

WILLIAM E. SCHUYLER, JR.
Commissioner of Patents